United States Patent [19]
Petersen

[11] 3,748,551
[45] July 24, 1973

[54] HIGH TEMPERATURE AND PRESSURE CAPACITANCE PROBE

[75] Inventor: Oscar J. Petersen, Orange, Calif.

[73] Assignee: Robertshaw Controls Company, Richmond, Va.

[22] Filed: Apr. 10, 1972

[21] Appl. No.: 242,582

[52] U.S. Cl. .............................................. 317/246
[51] Int. Cl.............................................. H01g 7/00
[58] Field of Search............................. 317/246, 242

[56] References Cited
UNITED STATES PATENTS
3,262,032   7/1966   Levine ............................... 317/246

*Primary Examiner*—E. A. Goldberg
*Attorney*—Vern Schooley et al.

[57] ABSTRACT

A high pressure resistant capacitance probe including a cylindrical housing forming an elongated first electrical conductor having a coaxial chamber formed therein with a bore leading from one end thereof. A rigid dielectric alumina tube as received on one extremity in such chamber and projects through the bore to form a closed ended sensor. An annular lava seal surrounds the one extremity of the tube and is firmly compressed into sealing engagement between the housing and tube to seal against entry into such chamber of high pressures. A second electrical conductor in the form of a coil spring is received in the tube to project coaxially with the first electrical conductor to cooperate therewith in providing a predetermined capacitance across the dielectric tube whereby contact of a conductive fluid with the sensor end of the tube will alter the capacitance thereof to provide a capacitance change in the wall of such tube thus indicating such fluid contact.

16 Claims, 3 Drawing Figures

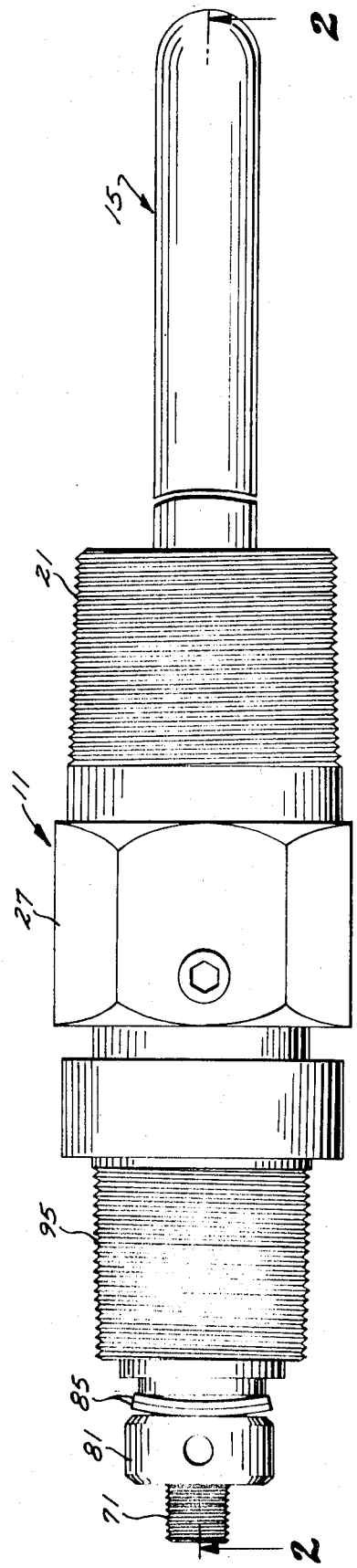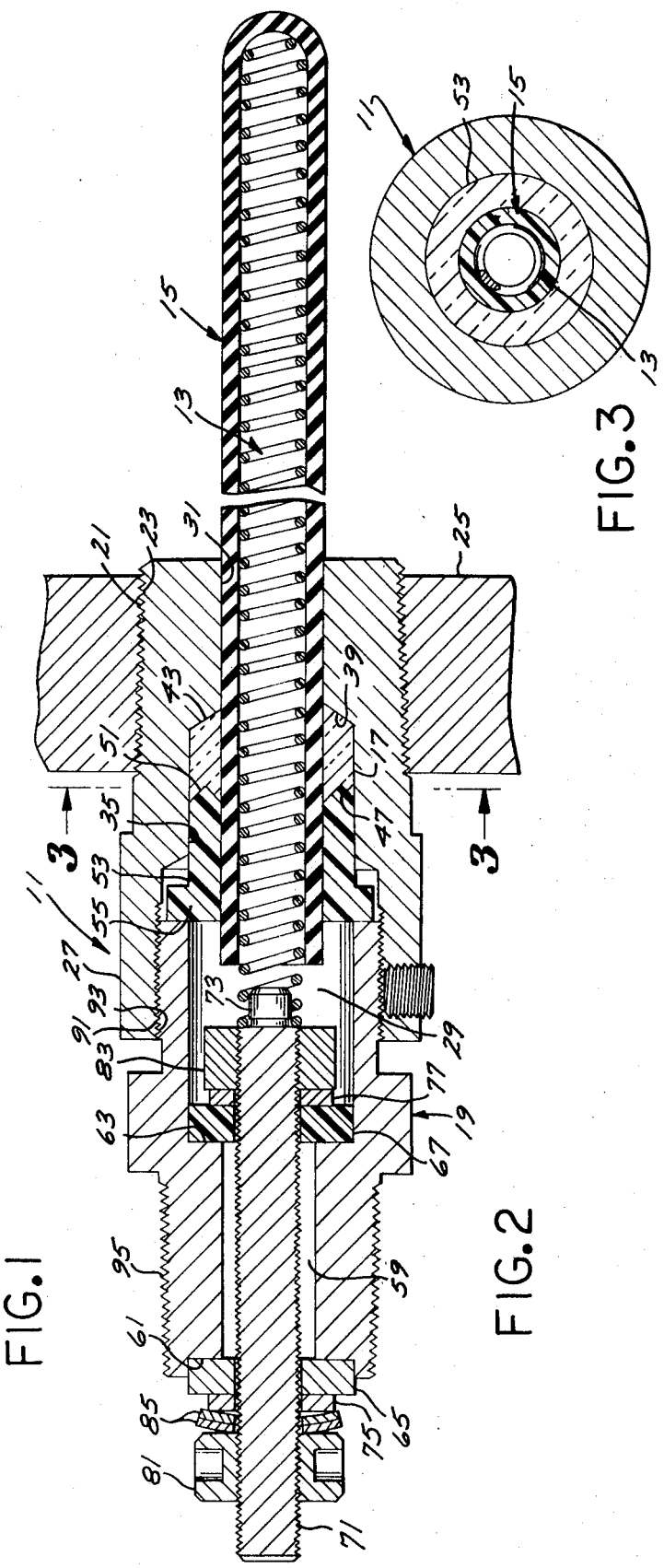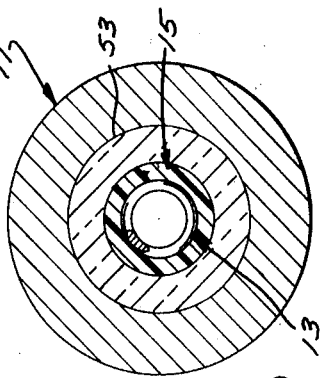

HIGH TEMPERATURE AND PRESSURE CAPACITANCE PROBE

BACKGROUND OF THE INVENTION

1. Field of the Invention

The present invention relates generally to capacitance probes and more particularly, to capacitance probes which are resistant to high pressures and temperatures to thereby enable such probes to be utilized in high pressure vessels.

2. Description of the Prior Art

Capacitance probes have been proposed which include coaxial conductors separated by dielectric tubes. Conventionally, Teflon seals are provided for sealing between the dielectric tube and the outer electrical conductor to prevent entry of high pressure gases into the probes. Capacitance probes of this type suffer the shortcoming that the teflon seals will only withstand temperatures of about 300°F at high pressures.

SUMMARY OF THE INVENTION

The high pressure resistant capacitance probe of present invention is characterized by coaxial inner and and outer electrical conductors separated by the wall of a dielectric tube which projects from the outer conductor and is closed on its projecting end to form a sensor. An annular lava seal surrounds the housed end of the tube and is compressed between such tube and the outer electrical conductor to form a tight seal therebetween to resist entry of high pressure gases when such probe is exposed to high pressures and temperature.

The objects and advantages of the present invention will become apparent from the consideration of the following detailed description when taken in conjunction with the accompanying drawing.

DESCRIPTION OF THE DRAWINGS

FIG. 1 is a side view of a high pressure resistant capacitance probe embodying the present invention;

FIG. 2 is a longitudinal sectional view taken along the line 2—2 of FIG. 1; and

FIG. 3 is a transverse sectional view, in reduced scale, taken along the line 3—3 of FIG. 2.

DESCRIPTION OF THE PREFERRED EMBODIMENT

The high pressure resistant capacitance probe of the present invention includes, generally, coaxial electrical conductors in the form of a cylindrical gland housing 11 and a helical spring 13 received in an alumina (Al$_2$O$_3$) tube 15 which forms the dielectric between such conductors. The alumina tube 15 is open on its housed end and a ring shaped lava seal 17 is received telescopically over the housed end of such tube and is pressed into firm sealing engagement between the housing 11 and tube 15 by means of an electrically conductive compression plug generally designated 19 to thereby form a positive seal between such tube and housing to resist entry into the housing 11 of high pressure and high temperature gases to which the probe may be exposed during sensing of a fluid level.

The probe of present invention is particularly useful for mounting in a fluid vessel with the closed end of the dielectric tube 15 extending longitudinally downwardly in such vessel to be contacted by conductive fluid filling such vessel to indicate the level of such fluid. The gland housing 11 is formed on its one extremity with exterior tapered threads 21 for receipt in cooperating interior tapered threads 23 formed in a bore drilled in the wall 25 of a fluid containing vessel. The opposite extremity of the gland housing 11 appears in the form of a hex nut 27.

The gland housing 11 includes a coaxial passage defining a rearward cylindrical cavity chamber 29 having a forwardly projecting bore 31 leading from the opposite extremity thereof for projection of the dielectric tube 15. Formed between such chamber 29 and the bore 31 is a seal-containing annulus 35 which tapers radially inwardly on its forward end to the bore 31 to form a conical wedge shaped sealing seat 39 for abutment by the complimentally shaped conical end 43 of the lava seal 17.

The lava seal 17 is made of magnesium silicate and is formed in its extremity opposite the conical end 43 with an annular rearwardly opening V-shaped groove 47 which defines oppositely angled wedge surfaces for engagement by the complimentally V-shaped annular end 51 of a compression bushing 53. The compression bushing 53 is formed in its opposite end with a radially outwardly projecting flange 55 that is engaged by the adjacent end of the compression plug 19.

The compression plug 19 is cylindrically shaped and includes a coaxial passage 59 which is increased in diameter at its opposite extremities to form oppositely facing annular shoulders 61 and 63 for receipt of electrically insulative washers 65 and 67.

Projecting coaxially through the insulative washers 65 and 67 is an electrically conductive threaded rod 71 which is formed on its interior extremity with a projecting knob 73 for receipt thereover of the adjacent extremity of the electrically conductive coil 13. Overlying the insulative washers 65 and 67 in axial relationship are washers 75 and 77 and screwed downwardly thereagainst are respective nuts 81 and 83, the nut 81 and washer 75 having a pair of spring washers 85 sandwiched therebetween.

One extremity of the compression plug 19 is formed with exterior threads 91 for receipt in complemental interior threads 93 formed in the adjacent end of the gland housing 11. The opposite end of the plug 19 is formed with exterior tapered threads 95 for receipt of an electrical coupling (not shown).

In operation the high pressure resistant capacitance probe of present invention is assembled as shown in FIG. 2 with the plug 19 torqued to approximately 100 ft-pounds to apply a highly compressive force to the lava seal 17 and to cause the conical end 43 of such seal to be urged radially inwardly to seal firmly against the outer surface of the wall of the dielectric tube 15 while the V-shaped wedge 51 of the compression bushing 53 tends to expand the opposite extremity of such seal to seal firmly against both the wall of the annulas 35 and wall of the tube 15. This feature is particularly important in the probe of present construction since the structural and economic requirements for the gland housing 11 and dielectric requirements of the dielectric tube 15 dictate that such gland and tube be constructed of materials having substantially different coefficients of thermal expansion thereby resulting in substantial differences in expansions thereof when the probe is subjected to high temperatures and requiring that the seal 17 accommodate such differentials in expansion while continuing to effectively seal against high pressure gases entering the chamber 29 around the periphery of the tube 15.

It has been determined that the probe of present invention may be mounted in the wall 25 of a high pressure vessel and such vessel subjected to pressures in excess of 1,000 psi and temperatures in the order of 1,000°F while the seal 17 continues to effectively seal against entry of high pressure gases into the chamber 29 and consequent alteration of the electrical characteristics of the probe.

The electrical coupling (not shown) is coupled with the threads 95 on the plug 19 and has a coaxial cable projecting therefrom and to a fluid level indicator (not shown) with one lead in such cable being in electrical contact with the electrically conductive plug 19, and consequently in contact with the electrically conductive gland housing 11, while the other lead is held in electrical contact with the threaded electrically conductive rods 71 leading to the rear extremity of the helical coil conductor 13.

As the pressure and temperature in the vessel of which the fluid level is being sensed is increased, the alumina tube 15 will have a tendency to warp or alter its configuration slightly and such tendency will be only in-significantly resisted by the spring 13 thus avoiding overstressing and consequent breaking of such tube.

As the fluid level in the vessel raises to the level of the projecting tip of the dielectric tube 15, the electrically conductive fluid will provide additional capacitance plate area to cooperate with the plate area formed by the body 11 in opposition to the spring 13 and rods 71 to alter the electrical capacitance across the tube 15 in direct proportion to the amount of exterior tube area submerged in such fluid to thereby provide an indication at the level indicator meter that the tube 15 has been contacted by the conductive fluid.

It will be appreciated that the helical spring 13 provides for a relatively small amount of contact area between such spring and the dielectric tube 15 thereby providing a relatively small capacitance gain over the length of such tube 15 to provide relatively small variations in capacitance as the level of the fluid raises upwardly along the length of such tube for convenient detection by the meter.

From the foregoing it will be apparent that the high temperature and pressure capacitance probe of present invention provides a reliable means for detecting fluid level in high pressure and high temperature systems and also in highly corrosive and caustic environments.

What Is Claimed Is:

1. A high pressure resistant capacitance probe comprising:
    a housing including a first elongated electrical conductor formed with a central cavity having an opening in one end thereof;
    a rigid elongated dielectric member received on one extremity in said cavity and projecting from said opening to form a sensor, said dielectric member being hollow to form a chamber disposed coextensive therewith;
    a second elongated electrical conductor in the form of an elongated coil received in said chamber and cooperating with said first conductor and dielectric member to develop an electrical capacitance across said dielectric member and being responsive to contact of said sensor with an electrically conductive fluid to vary said electrical capacitance;
    high pressure non-porous seal means surrounding said one extremity of said dielectric member and cooperating between said housing and member to seal said opening against entry of fluid under high pressure;
    anchoring means for securing said dielectric member in said housing; and
    mounting means for mounting said probe in the wall of a high pressure vessel whereby gases under high pressure in said vessel will be sealed against entry into said cavity by said seal means and contact of electrically conductive fluid in said vessel with said sensor will alter the capacitance between said electrical conductors to provide an electrically detectable output signal.

2. A high pressure resistant capacitance probe as set forth in claim 1 wherein:
    said housing is formed with a bore leading to said opening and formed with a necked down portion defining a seal seat tapering radially inwardly toward said opening; and
    said seal means includes an annular seal ring surrounding said one extremity of said dielectric member terminating on one end in a radially inwardly tapered surface for complimentally fitting and abutting said sealing surface.

3. A high pressure resistant capacitance probe as set forth in claim 1 wherein:
    said housing is made of a material having a coefficient of expansion different than said dielectric member and is formed with a bore leading to said opening and a necked down portion defining a seal seat; and
    said seal means is in the form of an annular ring made of magnesium silicate disposed in said bore for abutment on one end with said sealing seat and formed on the extremity opposite said one end with a wedge surface that angles radially inwardly and toward said opening; and
    said anchoring means includes an annular compression bushing surrounding said one extremity of said dielectric member to engage said wedge surface and means for compressing said bushing against said seal means.

4. A high pressure resistant capacitance probe as set forth in claim 1 wherein:
    said housing is made of a material having a coefficient of expansion different than said dielectric member and is formed with a bore leading to said opening and formed with a necked down portion defining a seal seat; and
    said seal means is in the form of an annular ring made of magnesium silicate disposed in said bore for abutment on one end with said sealing seat and formed on the extremity opposite said one end with a wedge surface that angles radially outwardly and toward said opening; and
    said anchoring means includes an annular compression bushing surrounding said one extremity of said dielectric member to engage said wedge surface and means for compressing said bushing against said seal means.

5. A high pressure resistant capacitance probe as set forth in claim 1 wherein:
    said housing includes a bore leading to said opening and formed with a necked down portion defining a sealing seat;

said seal means includes a magnesium silicate ring surrounding said dielectric member and disposed in said bore for abutment on one end with said sealing surface; and said anchor means includes means for engaging the end of said ring opposite said one end to press said ring toward said sealing seat.

6. A high pressure resistant capacitance probe as set forth in claim 1 wherein:

said housing includes gland means having said opening formed in one end thereof and including a bore leading rearwardly from said opening and formed with a necked out portion defining a sealing seat, said bore continuing rearwardly to form a seal-receiving annulas and an internally threaded portion;

said seal means is in the form of a sealing ring received in said annulas;

said anchoring means includes an annular bushing received in said bore for engaging the end of said seal opposite said one end and a compression plug for engaging said bushing and formed with external threads for receipt in said internal threads whereby said plug may be tightened in said housing axially to compress said sealing ring.

7. A high pressure resistant capacitance probe as set forth in claim 2 wherein:

said annular seal ring is made of magnesium silicate.

8. A high pressure resistant capacitance probe as set forth in claim 3 wherein:

said seal ring is formed said extremity opposite said one extremity with an annular groove that is V-shaped in cross section; and said bushing is formed on its extremity adjacent said ring with a V-shaped projecting edge that compliments the shape of said groove.

9. A high pressure resistant capacitance probe as set forth in claim 6 wherein:

said sealing ring is made of magnesium silicate.

10. A high pressure resistant capacitance probe comprising:

a housing including a first elongated electrical conductor formed with a central cavity having an opening in one end thereof;

a rigid elongated dielectric member received on one extremity in said cavity and projecting from said opening to form a sensor, said dielectric member being hollow to form a chamber disposed coextensive therewith;

a second elongated electrical conductor received in said chamber and cooperating with said first conductor and dielectric member to develop an electrical capacitance across said dielectric member and being responsive to contact of said sensor with an electrically conductive fluid to vary said electrical capacitance;

high pressure non-porous magnesium silicate seal means surrounding and in direct contact with said one extremity of said dielectric member;

constraining means in said housing, surrounding said sealing means and responsive to axial compression in one direction of said sealing means to compress said sealing means around said one extremity to seal against escape of high pressure fluid;

compression means engaged with said housing and operative to axially compress said seal means in said one direction; and mounting means for mounting said probe in the wall of a high pressure vessel whereby gases under high pressure in said vessel will be sealed against entry into said cavity by said seal means and contact of electrically conductive fluid in said vessel with said sensor will alter the capacitance between said electrical conductors to provide an electrically detectable output signal.

11. A high pressure resistant capacitance probe as set forth in claim 10 wherein:

said housing is formed with a bore defining said constraining means and leading to said opening and formed with a necked down portion defining a seal seat tapering radially inwardly toward said opening; and said seal means includes an annular seal ring surrounding said one extremity of said dielectric member and terminating on one end in a radially inwardly tapered surface for complimentally fitting and abutting said sealing surface.

12. A high pressure resistant capacitance probe as set forth in claim 10 wherein:

said housing is made of a material having a coefficient of expansion different than said dielectric member and is formed with a bore defining said constraining means and leading to said opening and including a necked down portion defining a seal seat;

said seal means is in the form of an annular ring made of magnesium silicate disposed in said bore for abutment on one end with said sealing seat and formed on the extremity opposite said one end with a wedge surface that angles radially inwardly and toward said opening; and said compression means includes an annular compression bushing surrounding said one extremity of said dielectric member to engage said wedge surface and means for compressing said bushing against said seal means.

13. A high pressure resistant capacitance probe as set forth in claim 10 wherein:

said housing is made of a material having a coefficient of expansion different than said dielectric member and is formed with a bore defining said constraining means leading to said opening and formed with a necked down portion defining a seal seat;

said seal means is in the form of an annular ring made of magnesium silicate disposed in said bore for abutment on one end with said sealing seat and formed on the extremity opposite said one end with a wedge surface that angles radially outwardly and toward said opening; and said compression means includes an annular compression bushing surrounding said one extremity of said dielectric member to engage said wedge surface and means for compressing said bushing against said seal means.

14. A high pressure resistant capacitance probe as set forth in claim 10 wherein:

said housing includes a bore defining said constraining means and leading to said opening and formed with a necked down portion defining a sealing seat;

said seal means includes a magnesium silicate ring surrounding said dielectric member and disposed in said bore for abutment on one end with said sealing surface; and said compression means includes means for engaging the end of said ring opposite said one end to press said ring toward said sealing seat.

15. A high pressure resistant capacitance probe as set forth in claim 10 wherein:

said housing includes gland means having said opening formed in one end thereof and including a bore defining said constraining means and leading rearwardly from said opening and formed with a necked out portion defining a sealing seat, said bore continuing rearwardly to form a seal-receiving annulas and an internally threaded portion;

said seal means is in the form of a sealing ring received in said annulas;

said compression means includes an annular bushing received in said bore for engaging the end of said seal opposite said one end and a compression plug for engaging said bushing and formed with external threads for receipt in said internal threads whereby said plug may be tightened in said housing axially to compress said sealing ring.

16. A high pressure resistant capacitance probe as set forth in claim 10 wherein:

said second electrical conductor is in the form of an elongated coil.

* * * * *